United States Patent
Tong et al.

(10) Patent No.: US 11,308,809 B2
(45) Date of Patent: Apr. 19, 2022

(54) COLLISION CONTROL METHOD AND APPARATUS, AND STORAGE MEDIUM

(71) Applicant: Shenzhen Sensetime Technology Co., Ltd., Shenzhen (CN)

(72) Inventors: Yuanyang Tong, Shenzhen (CN); Ningyuan Mao, Shenzhen (CN); Wenzhi Liu, Shenzhen (CN)

(73) Assignee: Shenzhen Sensetime Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/906,055

(22) Filed: Jun. 19, 2020

(65) Prior Publication Data

US 2020/0320879 A1   Oct. 8, 2020

Related U.S. Application Data

(63) Continuation of application No. PCT/CN2019/084527, filed on Apr. 26, 2019.

(30) Foreign Application Priority Data

Apr. 28, 2018   (CN) .......................... 201810404555.0

(51) Int. Cl.
*G08G 1/16* (2006.01)
*B60W 30/09* (2012.01)
(Continued)

(52) U.S. Cl.
CPC ............. *G08G 1/166* (2013.01); *B60W 30/09* (2013.01); *G06K 9/6217* (2013.01); *G06V 20/58* (2022.01); *G06V 20/584* (2022.01); *G06V 20/588* (2022.01)

(58) Field of Classification Search
CPC ... G08G 1/166; B60W 30/09; G06K 9/00798; G06K 9/00805; G06K 9/00825; G06K 9/6217
USPC ......................................... 340/435
See application file for complete search history.

(56) References Cited

U.S. PATENT DOCUMENTS

| | | | |
|---|---|---|---|
| 2012/0081542 A1* | 4/2012 | Suk | G06K 9/00805 348/139 |
| 2013/0135444 A1* | 5/2013 | Stein | G06T 7/246 348/47 |

(Continued)

FOREIGN PATENT DOCUMENTS

| | | |
|---|---|---|
| CN | 1862227 | 11/2006 |
| CN | 101016053 | 8/2007 |

(Continued)

OTHER PUBLICATIONS

WIPO, International Search Report dated Jul. 26, 2019, in PCT/CN2019/084527; 4 pgs.

(Continued)

*Primary Examiner* — Kerri L McNally
(74) *Attorney, Agent, or Firm* — Henry Patent Law Firm PLLC

(57) ABSTRACT

The present disclosure relates to a collision control method and apparatus, an electronic device, and a storage medium. The method includes: detecting a target object in an image photographed by a traveling object; determining a forward collision hazard region of the traveling object; and executing collision control on the traveling object based on a relative relationship between the target object and the forward collision hazard region, where the collision control includes collision warning and/or driving control.

16 Claims, 5 Drawing Sheets

(51) Int. Cl.
*G06K 9/62* (2022.01)
*G06V 20/58* (2022.01)
*G06V 20/56* (2022.01)

(56) References Cited

U.S. PATENT DOCUMENTS

| | | | | |
|---|---|---|---|---|
| 2015/0003670 A1* | 1/2015 | Kuehnle | G06T 7/73 | 382/103 |
| 2015/0197248 A1* | 7/2015 | Breed | G08G 1/167 | 701/93 |
| 2015/0217765 A1* | 8/2015 | Tokoro | G01S 13/867 | 701/1 |
| 2016/0107595 A1* | 4/2016 | Rosenbaum | B60R 21/013 | 348/148 |
| 2016/0221574 A1* | 8/2016 | Ikuta | B60W 30/09 | |
| 2017/0025003 A1* | 1/2017 | Arpin | G06K 9/00785 | |
| 2017/0210381 A1* | 7/2017 | Nishimura | B60W 10/20 | |
| 2018/0079408 A1* | 3/2018 | Takahashi | B60W 30/08 | |
| 2018/0268695 A1* | 9/2018 | Agnew | B60K 28/066 | |

FOREIGN PATENT DOCUMENTS

| | | |
|---|---|---|
| CN | 102059978 | 5/2011 |
| CN | 102303605 | 1/2012 |
| CN | 102765365 | 11/2012 |
| CN | 104527520 | 4/2015 |
| CN | 105620489 | 6/2016 |
| CN | 105718888 | 6/2016 |
| CN | 107133559 | 9/2017 |
| CN | 107139919 | 9/2017 |
| CN | 107886043 | 4/2018 |
| CN | 107933568 | 4/2018 |
| CN | 108549880 | 9/2018 |
| JP | 2008090748 | 4/2008 |
| JP | 2009271766 | 11/2009 |
| JP | 2014052883 | 3/2014 |
| JP | 2014059841 | 4/2014 |
| JP | 2015005187 | 1/2015 |
| JP | 2015024713 | 2/2015 |
| JP | 2018045482 | 3/2020 |
| WO | 2008065729 | 6/2008 |
| WO | 2016084149 | 6/2016 |

OTHER PUBLICATIONS

JPO, First Office Action dated Jun. 22, 2021, in corresponding Japanese application, JP 2020-555288, 10 pgs.
JPO, Office Action dated Feb. 22, 2022, in JP 2020-555288, 12 pgs.

* cited by examiner

COLLISION CONTROL METHOD AND APPARATUS, AND STORAGE MEDIUM

CROSS-REFERENCE TO RELATED APPLICATIONS

The present application is a continuation of and claims priority under 35 U.S.C. § 120 to PCT Application. No. PCT/CN2019/084527, filed on Apr. 26, 2019, which claims priority to Chinese Patent Application No. 201810404555.0, filed with the Chinese Patent Office on Apr. 28, 2018 and entitled "COLLISION CONTROL METHOD AND APPARATUS, ELECTRONIC DEVICE, AND STORAGE MEDIUM". All above-referenced priority documents are incorporated herein by reference in their entirety.

TECHNICAL FIELD

The present disclosure relates to the field of computer vision technologies, and in particular to a collision control method and apparatus, an electronic device, and a storage medium.

BACKGROUND

During intelligent driving of a vehicle, targets such as pedestrians and other vehicles needs to be sensed by using a computer vision technology, and the sensed targets are used for decision-making on the intelligent driving.

SUMMARY

The present disclosure provides technical solutions for collision control.

According to one aspect of the present disclosure, a collision control method is provided, including: detecting a target object in an image photographed by a traveling object; determining a forward collision hazard region of the traveling object; and executing collision control on the traveling object based on a relative relationship between the target object and the forward collision hazard region, where the collision control includes collision warning and/or driving control.

According to one aspect of the present disclosure, a collision control apparatus is provided, and the apparatus includes: a target object detection module, configured to detect a target object in an image photographed by a traveling object; a forward collision hazard region determination module, configured to determine a forward collision hazard region of the traveling object; and a collision control execution module, configured to execute collision control on the traveling object based on a relative relationship between the target object and the forward collision hazard region, where the collision control includes collision warning and/or driving control.

According to one aspect of the present disclosure, an electronic device is provided, including: a processor; and a memory configured to store processor executable instructions, where the processor directly or indirectly invokes the executable instructions to execute the foregoing collision control method.

According to one aspect of the present disclosure, a computer readable storage medium is provided, where the computer readable storage medium stores computer program instructions, and the foregoing collision control method is executed when the computer program instructions are executed by a processor.

According to one aspect of the present disclosure, a computer program is provided, where the foregoing collision control method is executed when the computer program is executed by a processor.

In the embodiments of the present disclosure, collision control is executed on the traveling object based on the relationship between the detected target object and the forward collision hazard region of the traveling object, so that the collision control on the traveling object is more pertinent, efficient, and accurate.

Exemplary embodiments are described in detail below with reference to the accompanying drawings, and other features and aspects of the present disclosure become clear.

BRIEF DESCRIPTION OF THE DRAWINGS

Accompanying drawings included in the specification and constructing a part of the specification jointly show the exemplary embodiments, characteristics, and aspects of the present disclosure, and are intended to explain the principles of the present disclosure.

DETAILED DESCRIPTION

The following will describe various exemplary embodiments, features, and aspects of the present disclosure in detail with reference to the accompanying drawings. Like accompanying symbols in the accompanying drawings represent elements with like or similar functions. Although various aspects of the embodiments are illustrated in the accompanying drawing, the accompanying drawings are not necessarily drawn in proportion unless otherwise specified.

The special term "exemplary" here means "used as an example, an embodiment, or an illustration". Any embodiment described as "exemplary" here is not necessarily to be interpreted as superior to or better than other embodiments.

In addition, for better illustration of the present disclosure, various specific details are given in the following specific implementations. A person skilled in the art should understand that the present disclosure may also be implemented without some specific details. In some examples, methods, means, elements, and circuits well known to a person skilled in the art are not described in detail so as to highlight the subject matter of the present disclosure.

Figure 1:
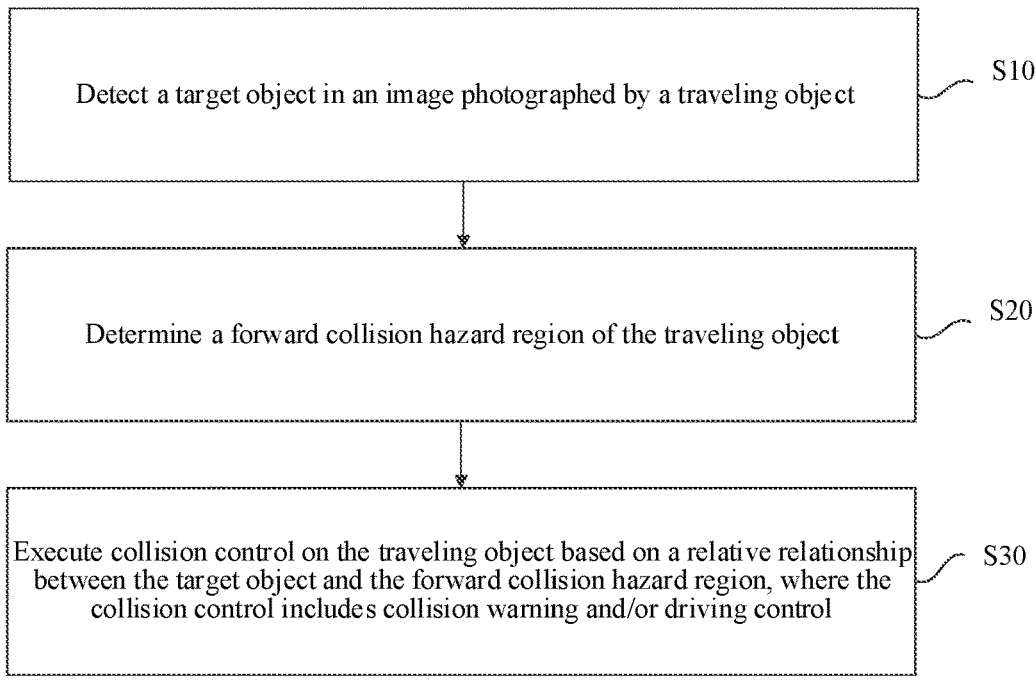
FIG. 1 is a flowchart of a collision control method according to an embodiment of the present disclosure.

FIG. 1 is a flowchart of a collision control method according to an exemplary embodiment of the present disclosure. As shown in FIG. 1, the collision control method includes the following steps.

At step S10, a target object in an image photographed by a traveling object is detected.

In a possible implementation, the target object may be any type of object. For example, the target object may include at least one of the following: a pedestrian, a vehicle, a non-motor vehicle, a plant, an animal, an obstacle, a robot, or a building.

The target object may one or more target objects in one object type, and may also be a plurality of target objects in a plurality of object types. For example, it is possible to use only a vehicle as the target object; the target object may be one vehicle, and may also be a plurality of vehicles. It is also possible to use a vehicle and a pedestrian jointly as the target object. The target object may be a plurality of vehicles and a plurality of pedestrians. As required, it is possible to use a specified object type as the target object, and it is also possible to use a specified individual object as the target object.

The traveling object may include a movable object such as a motor vehicle, a non-motor vehicle, or a robot. The traveling object may also be a device carried or worn by a person.

When the traveling object is a vehicle, the embodiments of the present disclosure may be used in the technical fields of automatic driving, assistant driving and the like. The traveling object may be determined as required. This is not limited in the present disclosure.

A photographing apparatus may be provided on the traveling object to photograph an image in a specified direction. The traveling object may photograph an image in any one or more directions such as a front direction, a rear direction, and a side direction of the traveling object. This is not limited in the present disclosure.

The image photographed by the traveling object may include a single frame image photographed by using the photographing apparatus, and may also include a frame image in a video stream photographed by using the photographing apparatus.

The traveling object may photograph images by using visual sensors such as a monocular camera, an RGB camera, an infrared camera, and a binocular camera. The monocular camera system has low costs and is quick in response, the RGB camera or the infrared camera may be used to photograph an image in a special environment, and the binocular camera may be used to obtain more abundant information about the target object. Different photographing devices are selected based on anti-collision requirements, an environment, the type of the traveling object, costs, and the like. This is not limited in the present disclosure.

A result obtained by detecting the target object in the image photographed by the traveling object may include a feature of the target object, and may also include a status of the target object. This is not limited in the present disclosure.

For example, the detection result includes the feature (for example, the pedestrian is an old person), the position (for example, the relative position of the target object with respect to the traveling object), the distance (for example, the distance between the target object and the traveling object), the speed (for example, the relative speed of the target object with respect to the traveling object), the acceleration, and the moving direction (for example, the moving direction of the target object with respect to the traveling object) of the target object.

At step S20, a forward collision hazard region of the traveling object is determined.

Figure 8A:
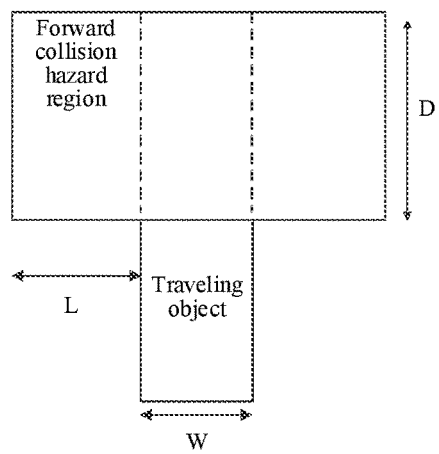
FIG. 8a is a schematic diagram of a forward collision hazard region in a collision control method according to an exemplary embodiment of the present disclosure.
Figure 8B:
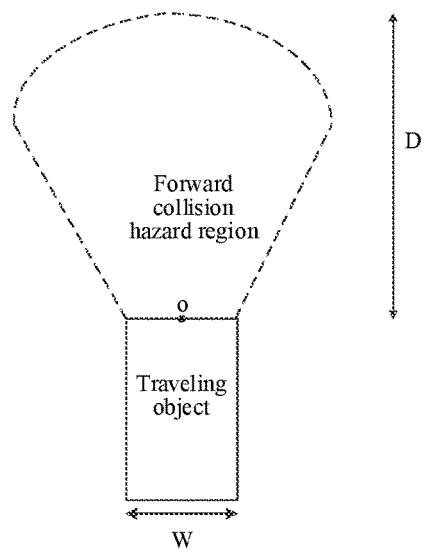
FIG. 8b is a schematic diagram of a forward collision hazard region in a collision control method according to an exemplary embodiment of the present disclosure.
Figure 8C:
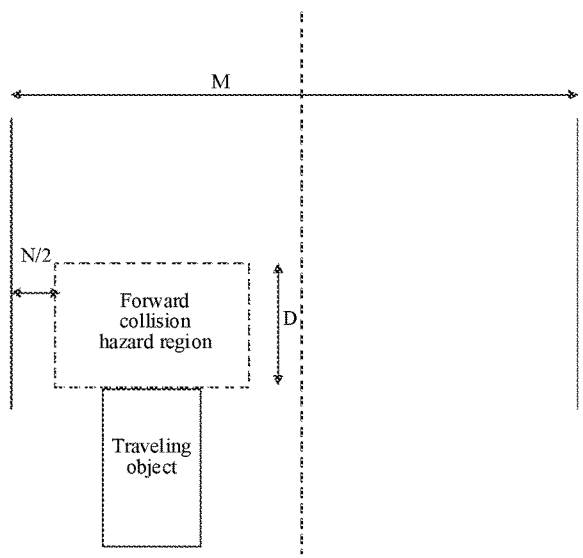
FIG. 8c is a schematic diagram of a forward collision hazard region in a collision control method according to an exemplary embodiment of the present disclosure.
Figure 8D:
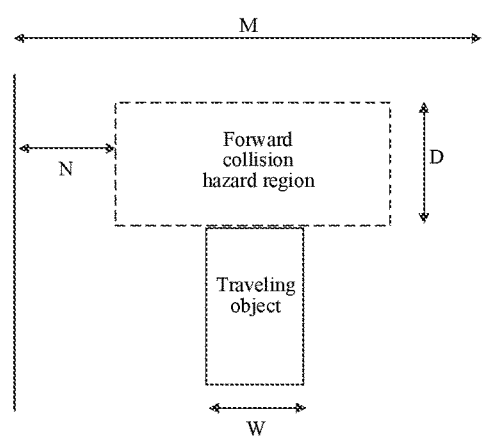
FIG. 8d is a schematic diagram of a forward collision hazard region in a collision control method according to an exemplary embodiment of the present disclosure.

In a possible implementation, the forward collision hazard region is a region in which collision may occur in a forward moving process of the traveling object or a region in which a collision probability meets a predetermined condition. The forward collision hazard region is determined based on an actual requirement and/or a detection condition. For example, the forward collision hazard region has, but not limited to, different shapes such as a rectangle, a sector, and a trapezoid. This is not limited in the present application. FIG. 8a, FIG. 8b, FIG. 8c, and FIG. 8d are schematic diagrams of forward collision hazard regions. FIG. 8a, FIG. 8c, and FIG. 8d show rectangular forward collision hazard regions, and FIG. 8b shows a sector-shaped forward collision hazard region.

At step S30, collision control is executed on the traveling object based on a relative relationship between the target object and the forward collision hazard region, where the collision control includes collision warning and/or driving control.

In a possible implementation, the relative relationship between the target object and the forward collision hazard region may include: the target object is inside or outside the forward collision hazard region, the target object tends to enter the forward collision hazard region (for example, the target object is outside the forward collision hazard region and the target object moves into the forward collision hazard region), and the like. The relative relationship between the target object and the forward collision hazard region may reflect a hazard degree of collision between the target object and the traveling object.

In the embodiments, collision control is executed on the traveling object based on the relationship between the detected target object and the forward collision hazard region of the traveling object, so that the collision control on the traveling object is more pertinent, efficient, and accurate.

Figure 2:
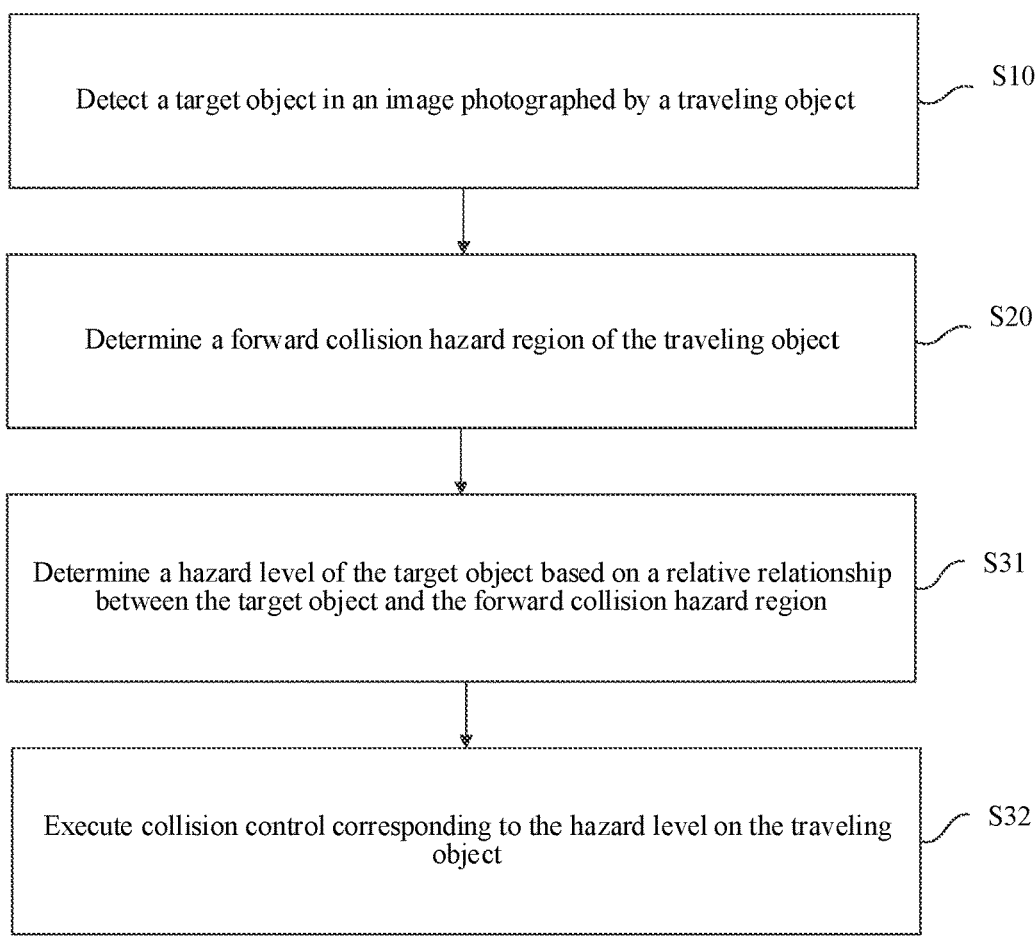
FIG. 2 is a flowchart of a collision control method according to an exemplary embodiment of the present disclosure.

FIG. 2 is a flowchart of a collision control method according to an exemplary embodiment of the present disclosure. As shown in FIG. 2, step S30 in the collision control method includes the following steps.

At step S31, a hazard level of the target object is determined based on the relative relationship between the target object and the forward collision hazard region.

At step S32, collision control corresponding to the hazard level is executed on the traveling object.

In a possible implementation, the hazard level of the target object is divided into a hazardous level, a safe level, or the like, and may also be divided into a first hazard level, a second hazard level, a third hazard level, or the like.

In a possible implementation, the collision control includes collision warning and/or driving control, and the driving control may include at least one of the following: changing a driving direction, changing a driving speed, or stopping.

Corresponding collision warning is executed based on the relative relationship between the target object and the forward collision hazard region, to warn an impending hazard. The collision warning may include various forms of warning such as sound warning (an alarm sound, a voice prompt, or the like), visual warning (an indicator lamp, on-screen display, or the like), and vibration warning. Different collision warning is set for different relative relationships, such as different voice or display contents, different volumes, and different vibration intensities. Corresponding collision warning is triggered based on the determined relative relationship, to help a user of the traveling object distinguish hazard degrees of various target objects.

For example, if the relative relationship is that the target object is in the forward collision hazard region, the hazard degree is relatively high, and collision warning executed corresponding to the relative relationship is a voice announcement: "There are pedestrians nearby. Please give way to them immediately!", or is a large-volume alarm sound. If the relative relationship is that the target object is in the forward collision hazard region, the hazard degree is relatively low, and collision warning executed corresponding to the relative relationship is a voice announcement: "Please be careful to give way to pedestrians", or is a low-volume alarm sound.

Different types of collision warning may be executed separately or in combination.

Driving control corresponding to the relative relationship may also be executed. For example, a corresponding driving control manner is determined based on the relative relationship, and a driving instruction corresponding to the driving control manner is transmitted to a control system of a vehicle, to implement driving control.

For example, if the relative relationship is that the target object is outside the forward collision hazard region, the hazard degree is relatively low, and driving control executed corresponding to the relative relationship is deceleration, for example, reducing the speed by 10%. If the relative relationship is that the target object is in the forward collision hazard region, the hazard degree is relatively high, and driving control executed corresponding to the relative relationship is greater deceleration, for example, reducing the speed by 50% or braking.

The collision warning and the driving control may be executed alternatively, and may also be executed simultaneously. If the target object and the forward collision hazard region are in different relative relationships, these correspond to different hazard levels. Different collision control is executed for different hazard levels to warn or avoid hazards.

In the embodiments, the relative relationship and the correspondence between the hazard level and the collision control are established, to implement accurate and pertinent collision control on the target object.

In a possible implementation, the hazard level includes a first hazard level and a second hazard level. Step S31 includes:

determining the hazard level of the target object as the first hazard level if the target object is in the forward collision hazard region; or determining the hazard level of the target object as the second hazard level if the target object is outside the forward collision hazard region.

The first hazard level is higher than the second hazard level. When the target object is in the forward collision hazard region, the hazard level of the target object is high; when the target object is outside the forward collision hazard region, the hazard level of the target object is low. The hazard degree of the first hazard level is higher than the hazard degree of the second hazard level, and the collision control level corresponding to the first hazard level is also higher than the collision control level corresponding to the second hazard level. For example, for the first hazard level, high-degree deceleration and high-volume sound reminding are executed, and for the second hazard level, low-degree deceleration and low-volume sound reminding are executed, or only sound reminding is executed. In this manner, the target objects in the forward collision hazard region and outside the forward collision hazard region are classified into different hazard levels, so that collision control may be executed more accurately.

In a possible implementation, the hazard level further includes a third hazard level. Step S31 includes:

determining the hazard level of the target object as the third hazard level if the target object is outside the forward collision hazard region and the target object moves into the forward collision hazard region.

The hazard degree of the third hazard level is lower than that of the first hazard level and higher than that of the second hazard level. The collision control level corresponding to the third hazard level is also higher than the collision control level corresponding to the second hazard level and higher than the collision control level corresponding to the first hazard level. For example, for the third hazard level, medium-degree deceleration and medium-volume sound reminding are executed. In this way, a proper hazard level is set for a target having a trend to enter the forward collision hazard region, so that collision control may be executed more accurately.

In the embodiments, the hazard level of the target object is determined based on the relative relationship between the target object and the forward collision hazard region, so that collision control is executed on the traveling object more pertinently. In this way, the collision control on the traveling object is more accurate.

Figure 3:
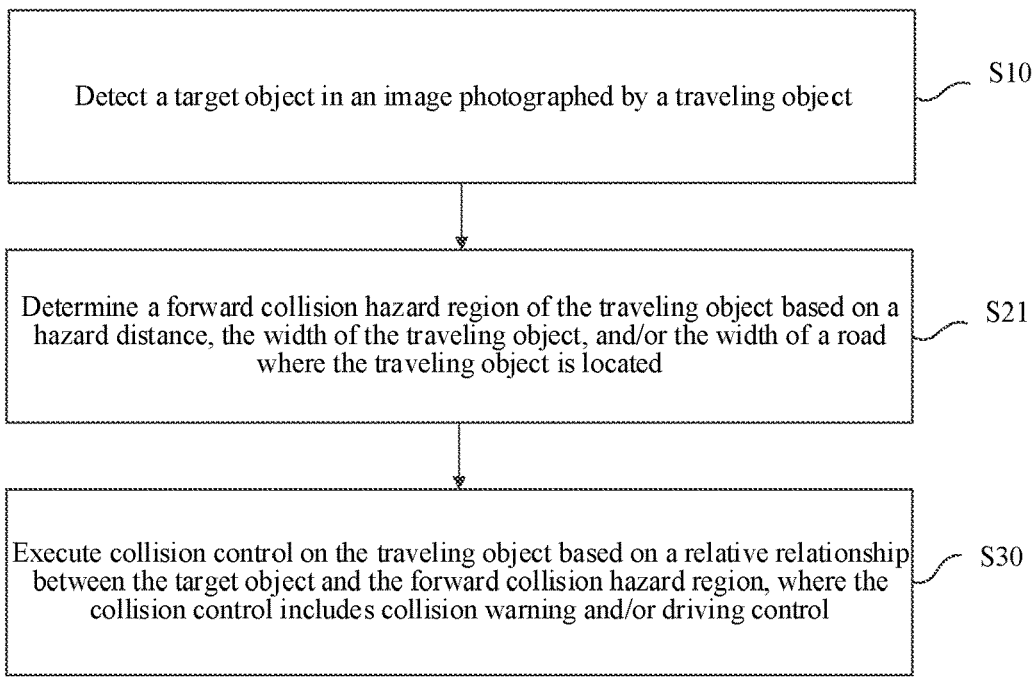
FIG. 3 is a flowchart of a collision control method according to an exemplary embodiment of the present disclosure.

FIG. 3 is a flowchart of a collision control method according to an exemplary embodiment of the present disclosure. As shown in FIG. 3, step S20 in the collision control method includes the following step.

At step S21, the forward collision hazard region of the traveling object is determined based on a hazard distance, the width of the traveling object, and/or the width of a road where the traveling object is located.

In a possible implementation, the forward collision hazard region is determined based on factors such as parameters of the traveling object and environment parameters.

In a possible implementation, the hazard distance may indicate a distance between the farthest boundary of the forward collision hazard region in front of the traveling object and the traveling object, for example, a distance D in FIG. 8a. The hazard distance is determined based on a requirement of collision control, an environment in which the traveling object is located, and a feature of the traveling object. For example, the higher the hazard degree of the environment in which the traveling object is located, the longer the hazard distance, and collision control is thus performed as early as possible.

The hazard distance is determined based on performance parameters of the traveling object, such as, the driving speed and the braking distance of the vehicle. The performance parameters may be obtained by performing real-time detection on the traveling object, and may also be obtained based on a preset parameter of the traveling object. The hazard distance may also be determined based on current environment factors, such as a snow accumulation extent, a water accumulation extent, or visibility. The environment factors may be obtained through real-time detection, and may also be obtained from an external database via the Internet or the like.

For example, the faster the driving speed of the vehicle, the longer the hazard distance; the longer the braking distance, the longer the hazard distance; and the worse the environment condition (such as heavy snow or water, or low visibility), the longer the hazard distance. The specific manner of determining the hazard distance is not limited in the present disclosure.

For example, the forward collision hazard region is determined based on the hazard distance and the width of the traveling object.

For example, the width W of the vehicle is obtained based on a preset parameter of the vehicle. A rectangular forward collision hazard region may be determined by using W as a width, the hazard distance D as a length, and a front contour of the vehicle as an edge, as shown by dashed lines in FIG. 8a. The rectangular region may be appropriately widened. For example, the width of the rectangular forward collision hazard region is widened to W+2L, as shown by solid lines in FIG. 8a. Both sides of the vehicle are respectively widened by L, and L is determined based on factors such as the parameters of the traveling object or the environment parameters.

For another example, a sector-shaped forward collision hazard region may be formed by using a point O in front of the vehicle as an origin, and the hazard distance D as a radius, as shown in FIG. 8b. The angle of the sector is determined based on the width W of the vehicle, and a wider W indicates a larger angle of the sector.

The forward collision hazard region of the traveling object may also be determined based on the hazard distance and the width of the road where the traveling object is located.

For example, the width M of the road where the vehicle is located is obtained through measurement or based on data from the Internet. Using a two-way lane as an example, a rectangular forward collision hazard region may be determined by using M/2−N as a width, the hazard distance D as a length, and a front contour of the vehicle as an edge, as shown in FIG. 8c. M/2 is the width of the road on which the vehicle travels, for example, the width of a left lane. N is determined based on factors such as road conditions or weather. For example, if there is traffic congestion, N is relatively large.

The forward collision hazard region may also be determined based on the hazard distance, the width of the traveling object, and the width of the road where the traveling object is located. For example, the width of the vehicle is W, the width of the road where the vehicle is located is M. A rectangular forward collision hazard region may be determined by using M−2N as a width, the hazard distance D as a length, and a front contour of the vehicle as an edge, as shown in FIG. 8d. M is the width of the road on which the vehicle travels, and N is related to W. N may also be determined based on factors such as road conditions or weather. For example, if there is traffic congestion, N is relatively large.

In the embodiments, the forward collision hazard region of the traveling object determined based on the hazard distance, the width of the traveling object, and/or the hazard distance and the width of the road where the traveling object is located may more conform to the factors such as the parameters of the traveling object and the environment parameters, so that collision control on the traveling object is more accurate.

Figure 4:
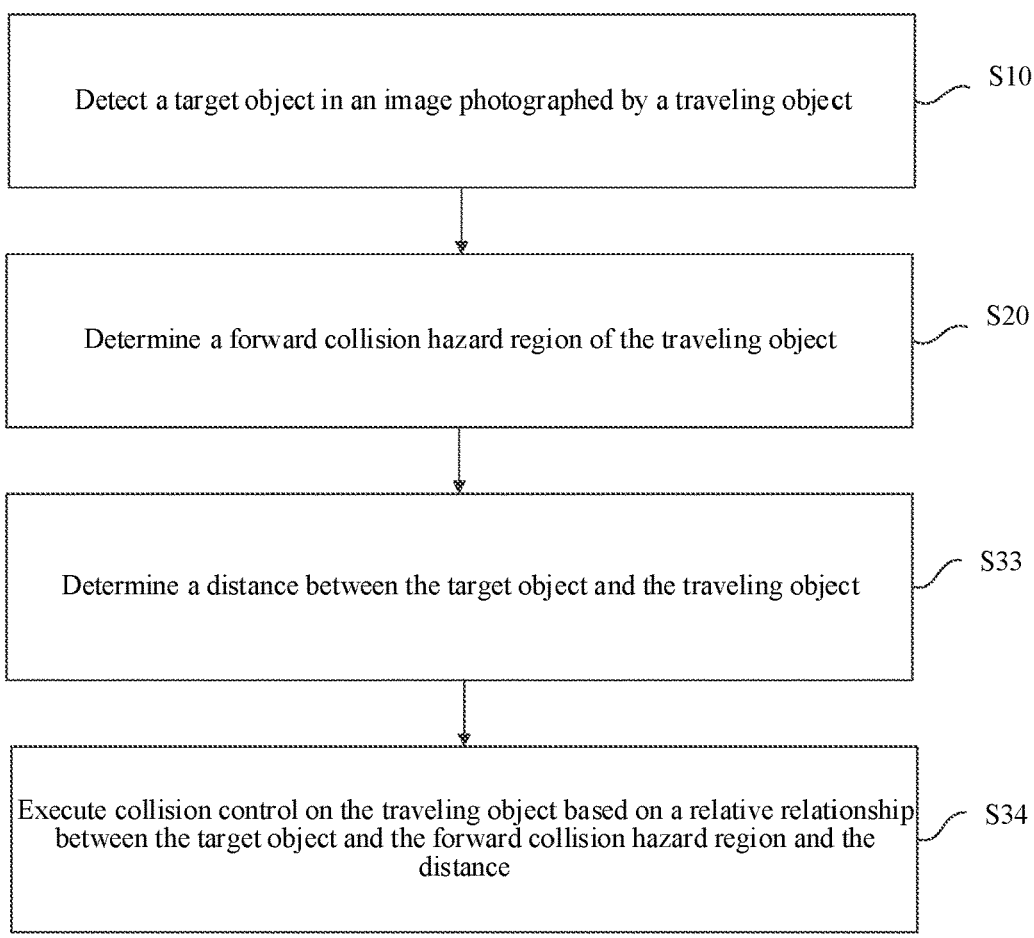
FIG. 4 is a flowchart of a collision control method according to an exemplary embodiment of the present disclosure.

FIG. 4 is a flowchart of a collision control method according to an exemplary embodiment of the present disclosure. As shown in FIG. 4, step S30 in the collision control method includes the following steps.

At step S33, a distance between the target object and the traveling object is determined.

At step S34, collision control is executed on the traveling object based on the relative relationship between the target object and the forward collision hazard region and the distance.

In a possible implementation, as described above, the distance between the target object and the traveling object may be determined based on the detection on the target object in the image photographed by the traveling object.

In a possible implementation, the collision control may include first collision control and second collision control. Step S34 may include:

executing the first collision control on the traveling object if the target object is in the forward collision hazard region and the distance is less than or equal to a first distance threshold; or executing the second collision control on the traveling object if the target object is in the forward collision hazard region and the distance is greater than the first distance threshold.

The level of the first collision control is higher than that of the second collision control, so that the shorter the distance from the target object in the forward collision hazard region to the traveling object, the higher the level of collision control executed on the traveling object. For example, the first collision control includes high-degree deceleration and high-volume sound reminding, and the second collision control includes medium-degree deceleration and medium-volume sound reminding.

In a possible implementation, the collision control may include third collision control and fourth collision control. Step S34 includes:

executing the third collision control on the traveling object if the target object is outside the forward collision hazard region and the distance is less than or equal to a second distance threshold; or executing the fourth collision control on the traveling object if the target object is outside the forward collision hazard region and the distance is greater than the second distance threshold.

The level of the third collision control is higher than that of the fourth collision control, so that the shorter the distance from the target object outside the forward collision hazard region to the traveling object, the higher the level of collision control executed on the traveling object. For example, the third collision control includes medium-degree deceleration and medium-volume sound reminding, and the fourth collision control includes low-degree deceleration and low-volume sound reminding.

The first distance threshold is less than the second distance threshold. For example, for the target object in the forward collision hazard region, a relatively small distance threshold (the first distance threshold), such as 5 meters, is set due to a relatively high hazard level of the target object, to execute collision control as early as possible. For the target object outside the forward collision hazard region, a relatively large distance threshold (the second distance threshold), such as 10 meters, is set due to a relatively low hazard level of the target object.

In the embodiments, collision control is executed on the traveling object based on the relative relationship between the target object and the forward collision hazard region, and the distance between the target object and the traveling object. In this way, the collision control on the traveling object is more accurate.

Figure 5:
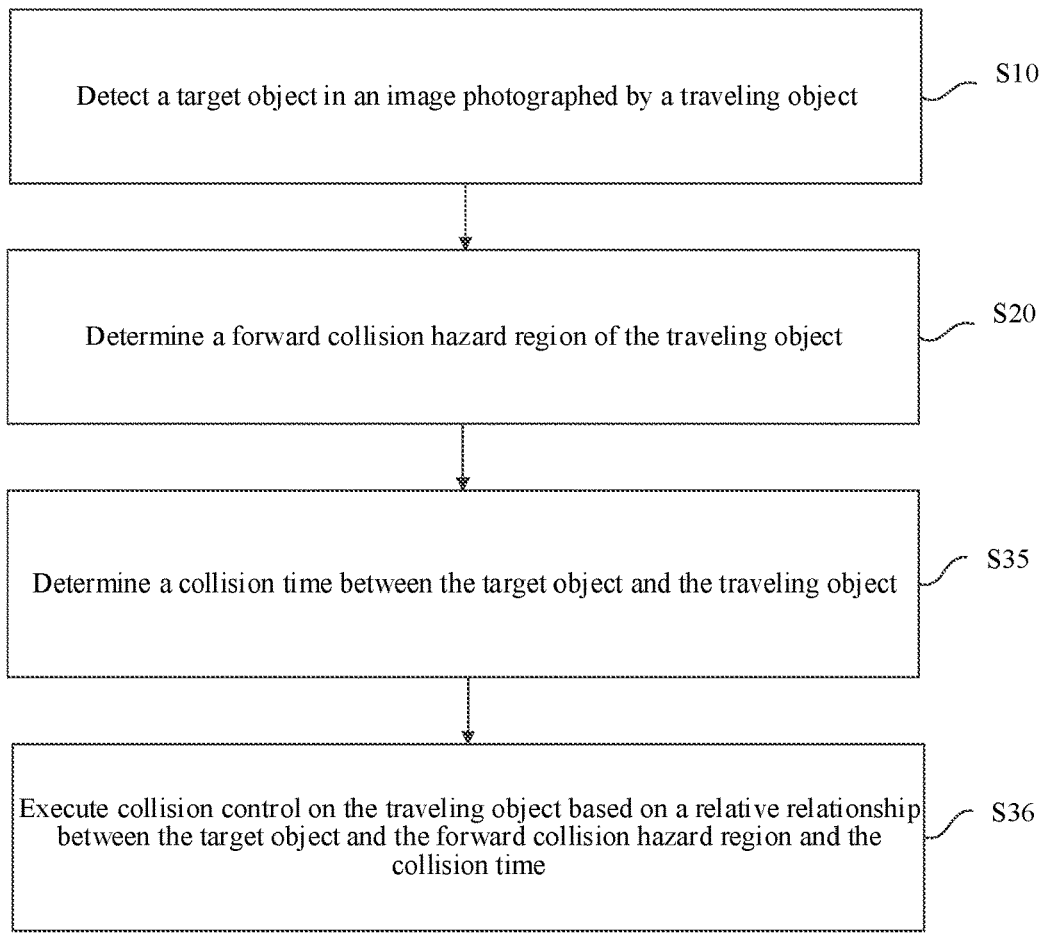
FIG. 5 is a flowchart of a collision control method according to an exemplary embodiment of the present disclosure.

FIG. 5 is a flowchart of a collision control method according to an exemplary embodiment of the present disclosure. As shown in FIG. 5, step S30 in the collision control method includes the following steps.

At step S35, a collision time between the target object and the traveling object is determined.

At step S36, collision control is executed on the traveling object based on the relative relationship between the target object and the forward collision hazard region and the collision time.

In a possible implementation, the collision time T between the target object and the traveling object is determined based on a relative moving direction between the target object and the traveling object, a distance S in the relative moving direction, and a relative speed V. When the target object and the traveling object move toward each other, T=S/V.

In a possible implementation, the collision control includes fifth collision control and sixth collision control. Step S36 includes:

executing the fifth collision control on the traveling object if the target object is in the forward collision hazard region and the collision time is less than or equal to a first time threshold; or executing the sixth collision control on the traveling object if the target object is in the forward collision hazard region and the collision time is greater than the first time threshold.

In a possible implementation, the collision control includes seventh collision control and eighth collision control. Step S36 includes:

executing the seventh collision control on the traveling object if the target object is outside the forward collision hazard region and the collision time is less than or equal to a second time threshold; or executing the eighth collision control on the traveling object if the target object is outside the forward collision hazard region and the collision time is greater than the second time threshold.

The first time threshold is less than the second time threshold. For example, for the target object in the forward collision hazard region, a relatively small time threshold (the first time threshold), such as 1 minute, is set due to a relatively high hazard level of the target object, to execute collision control as early as possible. For the target object outside the forward collision hazard region, a relatively large time threshold (the second time threshold), such as 3 minutes, is set due to a relatively low hazard level of the target object.

In the embodiments, collision control is executed on the traveling object based on the relative relationship between the target object and the forward collision hazard region, and the collision time between the target object and the traveling object. In this way, the collision control on the traveling object is more accurate.

In a possible implementation, step S10 in the collision control method may include: detecting the target object in the image photographed by the traveling object via a neural network.

The neural network is trained by using a training image set consisting of images of the target objects, and the target object in the photographed image is identified by using the trained neural network. A training process of the neural network and a process of detecting the target object via the neural network are implemented by using related technologies.

The neural network may be based on architectures such as a Region-based Fully Convolutional Network (RFCN), a Single Shot Multibox Detector (SSD), a Region-based Convolutional Neural Network (RCNN), a Fast Region-based Convolutional Neural Network (FastRCNN), a Faster Region-based Convolutional Neural Network (FasterRCNN), a Spatial Pyramid Pooling Convolutional Network (SPPNet), a Deformable Parts Model (DPM), Multi-Task Processing Using One Convolutional Network (OverFeat), and You Only Look Once (YOLO). This is not limited in the present disclosure.

For example, a same target object in multiple consecutive video frame images may be tracked by using an image tracking technology based on a neural network of Back Propagation (BP) or other types, to detect a moving status and a behavior status of the target object. For example, it is detected that the target object moves from the left front to the right front of the traveling object, and looks straight ahead.

For another example, the distance between the target object and the traveling object is determined by using an image photographed by a binocular camera through a binocular ranging technology based on a neural network of a Region-based Convolutional Neural Network (RCNN) or other types.

In the embodiments, by detecting the target object based on the neural network, the target object may be detected quickly and accurately in the image by using a powerful and accurate detection function of the neural network.

It can be understood that the foregoing method embodiments mentioned in the present disclosure are combined with each other to form a combined embodiment without departing from the principle and the logic. Details are not described in the present disclosure due to space limitation.

In addition, the present disclosure further provides an image processing apparatus, an electronic device, a computer readable storage medium, and a program. The foregoing are all used to implement any image processing method provided in the present disclosure. For corresponding technical solutions and descriptions, refer to corresponding descriptions of the method. Details are not described again.

Figure 6:
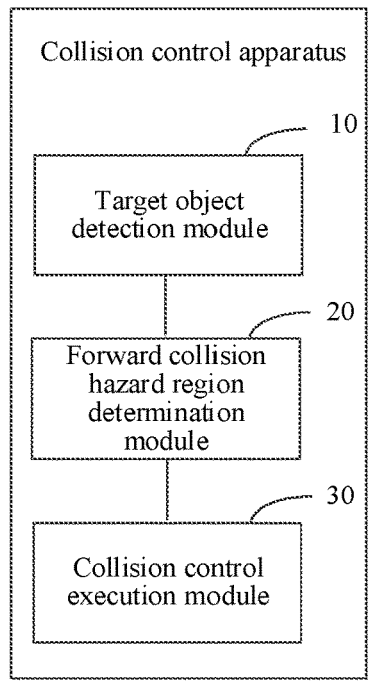
FIG. 6 is a block diagram of a collision control apparatus according to an exemplary embodiment of the present disclosure.

FIG. 6 is a block diagram of a collision control apparatus according to an exemplary embodiment of the present disclosure. As shown in FIG. 6, the collision control apparatus includes:

a target object detection module 10, configured to detect a target object in an image photographed by a traveling object;

a forward collision hazard region determination module 20, configured to determine a forward collision hazard region of the traveling object; and a collision control execution module 30, configured to execute collision control on the traveling object based on a relative relationship between the target object and the forward collision hazard region, where the collision control includes collision warning and/or driving control.

In the embodiments, collision control is executed on the traveling object based on the relationship between the detected target object and the forward collision hazard region of the traveling object, so that the collision control on the traveling object is more pertinent, efficient, and accurate.

In a possible implementation, the collision control execution module 30 includes:

a hazard level determination submodule, configured to determine a hazard level of the target object based on the relative relationship between the target object and the forward collision hazard region; and a first collision control execution submodule, configured to execute collision control corresponding to the hazard level on the traveling object.

In the embodiments, the relative relationship and the correspondence between the hazard level and the collision control are established, to implement accurate and pertinent collision control on the target object.

In a possible implementation, the hazard level includes a first hazard level and a second hazard level, and the hazard level determination submodule is configured to: determine the hazard level of the target object as the first hazard level if the target object is in the forward collision hazard region; and determine the hazard level of the target object as the second hazard level if the target object is outside the forward collision hazard region.

In this manner, target objects in the forward collision hazard region and outside the forward collision hazard region are classified into different hazard levels, so that collision control may be executed more accurately.

In a possible implementation, the hazard level further includes a third hazard level, and the hazard level determination submodule is configured to determine the hazard level of the target object as the third hazard level if the target object is outside the forward collision hazard region and the target object moves into the forward collision hazard region.

In the embodiments, the hazard level of the target object is determined based on the relative relationship between the target object and the forward collision hazard region, so that collision control is executed on the traveling object more pertinently. In this way, the collision control on the traveling object is more accurate.

In a possible implementation, the forward collision hazard region determination module 20 includes: a first forward collision hazard region determination submodule, configured to determine the forward collision hazard region of the traveling object based on a hazard distance, the width of the traveling object, and/or the width of a road where the traveling object is located.

In the embodiments, the forward collision hazard region of the traveling object determined based on the hazard distance, the width of the traveling object, and/or the width of the road where the traveling object is located may more conform to factors such as parameters of the traveling object and environment parameters, so that the collision control on the traveling object is more accurate.

In a possible implementation, the collision control execution module 30 includes: a distance determination submodule, configured to determine a distance between the target object and the traveling object; and a second collision control execution submodule, configured to execute collision control on the traveling object based on the relative relationship between the target object and the forward collision hazard region and the distance.

In a possible implementation, as described above, the distance between the target object and the traveling object may be determined based on the detection on the target object in the image photographed by the traveling object.

In a possible implementation, the collision control includes first collision control and second collision control, and the second collision control execution submodule is configured to: execute the first collision control on the traveling object if the target object is in the forward collision hazard region and the distance is less than or equal to a first distance threshold; or execute the second collision control on the traveling object if the target object is in the forward collision hazard region and the distance is greater than the first distance threshold.

The level of the first collision control is higher than that of the second collision control, so that the shorter the distance from the target object in the forward collision hazard region to the traveling object, the higher the level of collision control executed on the traveling object. For example, the first collision control includes high-degree deceleration and high-volume sound reminding, and the second collision control includes medium-degree deceleration and medium-volume sound reminding.

In a possible implementation, the collision control includes third collision control and fourth collision control, and the second collision control execution submodule is configured to: execute the third collision control on the traveling object if the target object is outside the forward collision hazard region and the distance is less than or equal to a second distance threshold; or execute the fourth collision control on the traveling object if the target object is outside the forward collision hazard region and the distance is greater than the second distance threshold.

The level of the third collision control is higher than that of the fourth collision control, so that the shorter the distance from the target object outside the forward collision hazard region to the traveling object, the higher the level of collision control executed on the traveling object. For example, the third collision control includes medium-degree deceleration and medium-volume sound reminding, and the fourth collision control includes low-degree deceleration and low-volume sound reminding.

The first distance threshold is less than the second distance threshold. For example, for the target object in the forward collision hazard region, a relatively small distance threshold (the first distance threshold), such as 5 meters, is set due to a relatively high hazard level of the target object, to execute collision control as early as possible. For the target object outside the forward collision hazard region, a relatively large distance threshold (the second distance threshold), such as 10 meters, is set due to a relatively low hazard level of the target object.

In the embodiments, collision control is executed on the traveling object based on the relative relationship between the target object and the forward collision hazard region, and the distance between the target object and the traveling object. In this way, the collision control on the traveling object is more accurate.

In a possible implementation, the collision control execution module 30 includes: a collision time determination submodule, configured to determine a collision time between the target object and the traveling object; and a third collision control execution submodule, configured to execute collision control on the traveling object based on the relative relationship between the target object and the forward collision hazard region and the collision time.

In a possible implementation, the collision time T between the target object and the traveling object is determined based on a relative moving direction between the target object and the traveling object, a distance S in the relative moving direction, and a relative speed V. When the target object and the traveling object move toward each other, T=S/V.

In a possible implementation, the collision control includes fifth collision control and sixth collision control, and the third collision control execution submodule is configured to: execute the fifth collision control on the traveling object if the target object is in the forward collision hazard region and the collision time is less than or equal to a first time threshold; or execute the sixth collision control on the traveling object if the target object is in the forward collision hazard region and the collision time is greater than the first time threshold.

In a possible implementation, the collision control includes seventh collision control and eighth collision control, and the third collision control execution submodule is configured to: execute the seventh collision control on the traveling object if the target object is outside the forward collision hazard region and the collision time is less than or equal to a second time threshold; or execute the eighth collision control on the traveling object if the target object is outside the forward collision hazard region and the collision time is greater than the second time threshold.

The first time threshold is less than the second time threshold. For example, for the target object in the forward collision hazard region, a relatively small time threshold (the first time threshold), such as 1 minute, is set due to a relatively high hazard level of the target object, to execute collision control as early as possible. For the target object outside the forward collision hazard region, a relatively large time threshold (the second time threshold), such as 3 minutes, is set due to a relatively low hazard level of the target object.

In the embodiments, collision control is executed on the traveling object based on the relative relationship between the target object and the forward collision hazard region, and the collision time between the target object and the traveling object. In this way, the collision control on the traveling object is more accurate.

In a possible implementation, the target object includes at least one of the following: a pedestrian, a vehicle, a non-motor vehicle, a plant, an animal, an obstacle, a robot, or a building.

In a possible implementation, the target object detection module 10 includes: a first target object detection submodule, configured to detect the target object in the image photographed by the traveling object via a neural network.

The neural network is trained by using a training image set consisting of images of the target objects, and the target object in the photographed image is identified by using the trained neural network. A training process of the neural network and a process of detecting the target object via the neural network are implemented by using related technologies.

In the embodiments, by detecting the target object based on the neural network, the target object may be detected quickly and accurately in the image by using a powerful and accurate detection function of the neural network.

In some embodiments, functions or modules included in the collision control apparatus provided in the embodiments of the present disclosure are configured to execute the method described in the foregoing collision control method embodiments. For specific implementation thereof, refer to the descriptions of the foregoing collision control method embodiment. For brevity, details are not described here again.

The embodiments of the present disclosure further provide a computer readable storage medium having computer program instruction stored thereon, where the foregoing collision control method is implemented when the computer program instructions are executed by a processor. The computer readable storage medium may be a non-volatile computer readable storage medium.

The embodiments of the present disclosure further provide an electronic device, including a processor, and a memory configured to store processor executable instructions, where the processor directly or indirectly invokes the executable instructions to execute the foregoing collision control method.

Figure 7:
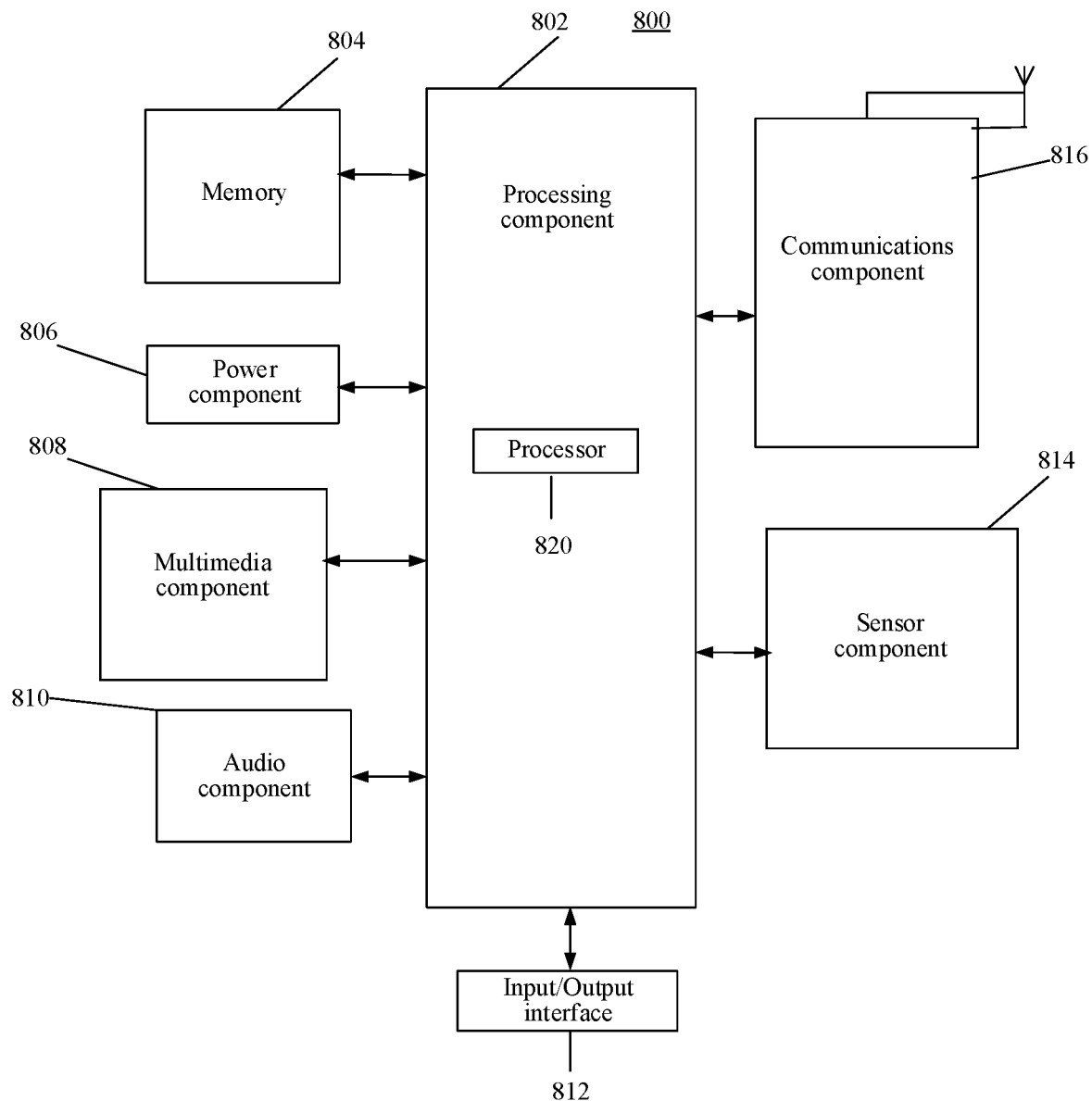
FIG. 7 is a block diagram of an electronic device according to an exemplary embodiment of the present disclosure.

FIG. 7 is a block diagram of an electronic device according to an exemplary embodiment of the present disclosure. The electronic device may be provided as a terminal, a server, or other forms of devices. The electronic device includes a collision control apparatus 800. For example, the apparatus 800 may be a terminal such as a mobile phone, a computer, a digital broadcast terminal, a message transceiver device, a game console, a tablet device, a medical device, a fitness device, a personal digital assistant, or a vehicle-mounted device.

Referring to FIG. 7, the apparatus 800 may include one or more of the following components: a processing component 802, a memory 804, a power component 806, a multimedia component 808, an audio component 810, an input/output (I/O) interface 812, a sensor component 814, and a communications component 816.

The processing component 802 generally controls an overall operation of the apparatus 800, such as operations associated with display, a telephone call, data communication, a camera operation, and a recording operation. The processing component 802 may include one or more processors 820 to execute an instruction, to complete all or some of the steps of the foregoing method. In addition, the processing component 802 may include one or more modules, to facilitate interaction between the processing component 802 and other components. For example, the processing component 802 includes a multimedia module, to facilitate interaction between the multimedia component 808 and the processing component 802.

The memory 804 is configured to store data of various types to support operations on the apparatus 800. For example, the data includes an instruction, contact data, phone book data, a message, an image, or a video of any application program or method operated on the apparatus 800. The memory 804 is implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

The power component 806 supplies power to the components of the apparatus 800. The power component 806 may include a power management system, one or more power supplies, and other components associated with power generation, management, and distribution for the apparatus 800.

The multimedia component 808 includes a screen between the apparatus 800 and a user to provide an output interface. In some embodiments, the screen may include a Liquid Crystal Display (LCD) and a Touch Panel (TP). If the screen includes the touch panel, the screen is implemented as a touchscreen, to receive an input signal from the user. The touch panel includes one or more touch sensors to sense a touch, a slide, and a gesture on the touch panel. The touch sensor may not only sense a boundary of a touch action or a slide action, but also detect the duration and pressure related to the touch operation or the slide operation. In some embodiments, the multimedia component 808 includes a front-facing camera and/or a rear-facing camera. When the apparatus 800 is in an operation mode, for example, a photographing mode or a video mode, the front-facing camera and/or the rear-facing camera may receive external multimedia data. Each front-facing camera or rear-facing camera is a fixed optical lens system or has a focal length and an optical zoom capability.

The audio component 810 is configured to output and/or input an audio signal. For example, the audio component 810 includes one microphone (MIC). When the apparatus 800 is in an operation mode, such as a call mode, a recording mode, or a voice recognition mode, the microphone is configured to receive an external audio signal. The received audio signal is further stored in the memory 804 or sent by means of the communications component 816. In some embodiments, the audio component 810 further includes a speaker, configured to output an audio signal.

The I/O interface 812 provides an interface between the processing component 802 and a peripheral interface module, and the peripheral interface module is a keyboard, a click wheel, a button, or the like. These buttons may include but are not limited to a home button, a volume button, a startup button, and a lock button.

The sensor component 814 includes one or more sensors, and is configured to provide status evaluation in various aspects for the apparatus 800. For example, the sensor component 814 may detect an on/off state of the apparatus 800 and relative positioning of the components, for example, the components are a display and a keypad of the apparatus 800. The sensor component 814 may also detect a location change of the apparatus 800 or a component of the apparatus 800, existence or nonexistence of contact between the user and the apparatus 800, an orientation or acceleration/deceleration of the apparatus 800, and a temperature change of the apparatus 800. The sensor component 814 may include a proximity sensor, configured to detect existence of a nearby object when there is no physical contact. The sensor component 814 may further include an optical sensor, such as a CMOS or CCD image sensor, configured for use in an imaging application. In some embodiments, the sensor component 814 may further include an acceleration sensor, a gyro sensor, a magnetic sensor, a pressure sensor, or a temperature sensor.

The communications component 816 is configured to facilitate wired or wireless communication between the apparatus 800 and other devices. The apparatus 800 is connected to a communication standard-based wireless network, such as Wi-Fi, 2G or 3G, or a combination thereof. In an exemplary embodiment, the communications component 816 receives a broadcast signal or broadcast-related information from an external broadcast management system through a broadcast channel. In an exemplary embodiment, the communications component 816 further includes a Near Field Communication (NFC) module, to promote short-range communication. For example, the NFC module is implemented based on a Radio Frequency Identification (RFID) technology, an Infrared Data Association (IrDA) technology, an Ultra Wideband (UWB) technology, a Bluetooth (BT) technology, and other technologies.

In an exemplary embodiment, the apparatus 800 is implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components, and is configured to perform the foregoing method.

In an exemplary embodiment, a non-volatile computer readable storage medium, for example, the memory 804 including a computer program instruction, is further provided. The computer program instruction is executed by the processor 820 of the apparatus 800 to complete the foregoing method.

In an exemplary embodiment, a computer program is further provided. Any one of the foregoing methods is executed if the computer program is executed by a processor. For example, the computer program is executed by the processor 820 of the apparatus 800 to complete any one of the foregoing methods.

The present disclosure may be a system, a method, and/or a computer program product. The computer program product may include a computer readable storage medium, on which computer readable program instructions used by the processor to implement various aspects of the present disclosure are stored.

The computer readable storage medium is a tangible device that can maintain and store instructions used by an instruction execution device. For example, the computer readable storage medium may be, but not limited to, an electrical storage device, a magnetic storage device, an optical storage device, an electromagnetic storage device, a semiconductor storage device, or any appropriate combination thereof. More specific examples (a non-exhaustive list) of the computer readable storage medium include a portable computer disk, a hard disk, a Random Access Memory (RAM), a Read-Only Memory (ROM), an Erasable Programmable Read-Only Memory (EPROM or flash memory), a Static Random Access Memory (SRAM), a portable Compact Disc Read-Only Memory (CD-ROM), a Digital Versatile Disk (DVD), a memory stick, a floppy disk, a mechanical coding device such as a punched card storing an instruction or a protrusion structure in a groove, and any appropriate combination thereof. The computer readable storage medium used here is not interpreted as an instantaneous signal such as a radio wave or other freely propagated electromagnetic wave, an electromagnetic wave propagated by a waveguide or other transmission media (for example, an optical pulse transmitted by an optical fiber cable), or an electrical signal transmitted by a wire.

The computer readable program instruction described here is downloaded from a computer readable storage medium to each computing/processing device, or downloaded to an external computer or an external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives the computer readable program instruction from the network, and forwards the computer readable program instruction, so that the computer readable program instruction is stored in a computer readable storage medium in each computing/processing device.

Computer program instructions for executing the operations of the present disclosure are compilation instructions, instruction set architecture (ISA) instructions, machine instructions, machine-related instructions, microcode, firmware instructions, status setting data, or source code or target code written in any combination of one or more programming languages. The programming languages include an object-oriented programming language such as Smalltalk or C++, and a conventional procedural programming language such as the "C" language or a similar programming language. The program readable program instructions can be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any type of network, including a Local Area Network (LAN) or a Wide Area Network (WAN), or may be connected to an external computer (for example, connected via the Internet with the aid of an Internet service provider). In some embodiments, an electronic circuit such as a programmable logic circuit, a Field Programmable Gate Array (FPGA), or a Programmable Logic Array (PLA) is personalized by using status information of the computer readable program instructions, and the electronic circuit can execute the computer readable program instructions to implement various aspects of the present disclosure.

Various aspects of the present disclosure are described here with reference to the flowcharts and/or block diagrams of the methods, apparatuses (systems), and computer program products according to the embodiments of the present disclosure. It should be understood that each block in the flowcharts and/or block diagrams and a combination of the blocks in the flowcharts and/or block diagrams can be implemented with the computer readable program instructions.

These computer readable program instructions may be provided for a general-purpose computer, a dedicated computer, or a processor of another programmable data processing apparatus to generate a machine, so that when the instructions are executed by the computer or the processors of other programmable data processing apparatuses, an apparatus for implementing a specified function/action in one or more blocks in the flowcharts and/or block diagrams is generated. These computer readable program instructions may also be stored in a computer readable storage medium, and these instructions instruct a computer, a programmable data processing apparatus, and/or other devices to work in a specific manner. Therefore, the computer readable storage medium having the instructions stored thereon includes a manufacture, and the manufacture includes instructions for implementing specified functions/actions in one or more blocks in the flowcharts and/or block diagrams.

The computer readable program instructions may also be loaded onto a computer, other programmable data processing apparatuses, or other devices, so that a series of operations and steps are executed on the computer, the other programmable apparatuses, or the other devices, thereby generating computer-implemented processes. Therefore, the instructions executed on the computer, the other programmable apparatuses, or the other devices implement the specified functions/actions in the one or more blocks in the flowcharts and/or block diagrams.

The flowcharts and block diagrams in the accompanying drawings show architectures, functions, and operations that may be implemented by the systems, methods, and computer program products in the embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, functions marked in the block may also occur in an order different from that marked in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system configured to execute specified functions or actions, or may be implemented by using a combination of dedicated hardware and computer instructions.

The embodiments of the present disclosure are described above. The foregoing descriptions are exemplary but not exhaustive, and are not limited to the disclosed embodiments. For a person of ordinary skill in the art, many modifications and variations are all obvious without departing from the scope and spirit of the described embodiments. The terms used herein are intended to best explain the principles of the embodiments, practical applications, or technical improvements to the technologies in the market, or to enable other persons of ordinary skill in the art to understand the embodiments disclosed herein.

What is claimed is:

1. A collision control method, wherein the method comprises:
   detecting a target object in an image photographed by a traveling object;
   determining a forward collision hazard region of the traveling object; and
   executing collision control on the traveling object based on a relative relationship between the target object and the forward collision hazard region, wherein the collision control comprises collision warning and/or driving control,
   wherein determining the forward collision hazard region of the traveling object comprises:
      determining the forward collision hazard region of the traveling object based on a hazard distance and at least one of the width of the traveling object or the width of a road where the traveling object is located,
   wherein executing collision control on the traveling object based on the relative relationship between the target object and the forward collision hazard region comprises:
      determining a distance between the target object and the traveling object; and
      executing collision control on the traveling object based on the relative relationship between the target object and the forward collision hazard region and the distance.

2. The method according to claim 1, wherein executing collision control on the traveling object based on the relative relationship between the target object and the forward collision hazard region comprises:
   determining a hazard level of the target object based on the relative relationship between the target object and the forward collision hazard region; and
   executing collision control corresponding to the hazard level on the traveling object.

3. The method according to claim 2, wherein the hazard level comprises a first hazard level and a second hazard level, and determining the hazard level of the target object based on the relative relationship between the target object and the forward collision hazard region comprises:
   determining the hazard level of the target object as the first hazard level if the target object is in the forward collision hazard region; or
   determining the hazard level of the target object as the second hazard level if the target object is outside the forward collision hazard region.

4. The method according to claim 3, wherein the hazard level further comprises a third hazard level, and determining the hazard level of the target object based on the relative relationship between the target object and the forward collision hazard region comprises:

determining the hazard level of the target object as the third hazard level if the target object is outside the forward collision hazard region and the target object moves into the forward collision hazard region.

5. The method according to claim 1, wherein the collision control comprises first collision control and second collision control, and executing collision control on the traveling object based on the relative relationship between the target object and the forward collision hazard region and the distance comprises:

executing the first collision control on the traveling object if the target object is in the forward collision hazard region and the distance is less than or equal to a first distance threshold; or executing the second collision control on the traveling object if the target object is in the forward collision hazard region and the distance is greater than the first distance threshold, or the collision control comprises third collision control and fourth collision control, and executing collision control on the traveling object based on the relative relationship between the target object and the forward collision hazard region and the distance comprises:

executing the third collision control on the traveling object if the target object is outside the forward collision hazard region and the distance is less than or equal to a second distance threshold; or executing the fourth collision control on the traveling object if the target object is outside the forward collision hazard region and the distance is greater than the second distance threshold.

6. The method according to claim 1, wherein executing collision control on the traveling object based on the relative relationship between the target object and the forward collision hazard region comprises:

determining a collision time between the target object and the traveling object; and executing collision control on the traveling object based on the relative relationship between the target object and the forward collision hazard region and the collision time.

7. The method according to claim 6, wherein the collision control comprises fifth collision control and sixth collision control, and executing collision control on the traveling object based on the relative relationship between the target object and the forward collision hazard region and the collision time comprises:

executing the fifth collision control on the traveling object if the target object is in the forward collision hazard region and the collision time is less than or equal to a first time threshold;

executing the sixth collision control on the traveling object if the target object is in the forward collision hazard region and the collision time is greater than the first time threshold, or the collision control comprises seventh collision control and eighth collision control, and executing collision control on the traveling object based on the relative relationship between the target object and the forward collision hazard region and the collision time comprises:

executing the seventh collision control on the traveling object if the target object is outside the forward collision hazard region and the collision time is less than or equal to a second time threshold; or executing the eighth collision control on the traveling object if the target object is outside the forward collision hazard region and the collision time is greater than the second time threshold.

8. The method according to claim 1, wherein detecting the target object in the image photographed by the traveling object comprises:

detecting the target object in the image photographed by the traveling object via a neural network.

9. A collision control apparatus, wherein the apparatus comprises:

a processor; and a memory configured to store processor executable instructions which, when executed by the processor, cause the processor to:

detect a target object in an image photographed by a traveling object;

determine a forward collision hazard region of the traveling object; and execute collision control on the traveling object based on a relative relationship between the target object and the forward collision hazard region, wherein the collision control comprises collision warning and/or driving control, wherein determining the forward collision hazard region of the traveling object comprises:

determining the forward collision hazard region of the traveling object based on a hazard distance and at least one of the width of the traveling object or the width of a road where the traveling object is located, wherein executing collision control on the traveling object based on the relative relationship between the target object and the forward collision hazard region comprises:

determining a distance between the target object and the traveling object; and executing collision control on the traveling object based on the relative relationship between the target object and the forward collision hazard region and the distance.

10. The apparatus according to claim 9, wherein executing collision control on the traveling object based on the relative relationship between the target object and the forward collision hazard region comprises:

determining a hazard level of the target object based on the relative relationship between the target object and the forward collision hazard region; and executing collision control corresponding to the hazard level on the traveling object.

11. The apparatus according to claim 10, wherein the hazard level comprises a first hazard level and a second hazard level, and determining the hazard level of the target object based on the relative relationship between the target object and the forward collision hazard region comprises:

determining the hazard level of the target object as the first hazard level if the target object is in the forward collision hazard region; or determining the hazard level of the target object as the second hazard level if the target object is outside the forward collision hazard region.

12. The apparatus according to claim 11, wherein the hazard level further comprises a third hazard level, and determining the hazard level of the target object based on the relative relationship between the target object and the forward collision hazard region comprises:

determining the hazard level of the target object as the third hazard level if the target object is outside the forward collision hazard region and the target object moves into the forward collision hazard region.

13. The apparatus according to claim 9, wherein
the collision control comprises first collision control and second collision control, and executing collision control on the traveling object based on the relative relationship between the target object and the forward collision hazard region and the distance comprises:
executing the first collision control on the traveling object if the target object is in the forward collision hazard region and the distance is less than or equal to a first distance threshold; or
executing the second collision control on the traveling object if the target object is in the forward collision hazard region and the distance is greater than the first distance threshold, or
the collision control comprises third collision control and fourth collision control, and executing collision control on the traveling object based on the relative relationship between the target object and the forward collision hazard region and the distance comprises:
executing the third collision control on the traveling object if the target object is outside the forward collision hazard region and the distance is less than or equal to a second distance threshold; or
executing the fourth collision control on the traveling object if the target object is outside the forward collision hazard region and the distance is greater than the second distance threshold.

14. The apparatus according to claim 9, wherein executing collision control on the traveling object based on the relative relationship between the target object and the forward collision hazard region comprises:
determining a collision time between the target object and the traveling object; and
executing collision control on the traveling object based on the relative relationship between the target object and the forward collision hazard region and the collision time.

15. The apparatus according to claim 14, wherein
the collision control comprises fifth collision control and sixth collision control, and executing collision control on the traveling object based on the relative relationship between the target object and the forward collision hazard region and the collision time comprises:
executing the fifth collision control on the traveling object if the target object is in the forward collision hazard region and the collision time is less than or equal to a first time threshold; or
executing the sixth collision control on the traveling object if the target object is in the forward collision hazard region and the collision time is greater than the first time threshold, or
the collision control comprises seventh collision control and eighth collision control, and executing collision control on the traveling object based on the relative relationship between the target object and the forward collision hazard region and the collision time comprises:
executing the seventh collision control on the traveling object if the target object is outside the forward collision hazard region and the collision time is less than or equal to a second time threshold; or
executing the eighth collision control on the traveling object if the target object is outside the forward collision hazard region and the collision time is greater than the second time threshold.

16. A non-transitory computer readable storage medium having computer program instructions stored thereon, wherein when the computer program instructions are executed by a processor, the processor is caused to implement a collision control method comprising:
detecting a target object in an image photographed by a traveling object;
determining a forward collision hazard region of the traveling object; and
executing collision control on the traveling object based on a relative relationship between the target object and the forward collision hazard region, wherein the collision control comprises collision warning and/or driving control,
wherein determining the forward collision hazard region of the traveling object comprises:
determining the forward collision hazard region of the traveling object based on a hazard distance and at least one of the width of the traveling object or the width of a road where the traveling object is located,
wherein executing collision control on the traveling object based on the relative relationship between the target object and the forward collision hazard region comprises:
determining a distance between the target object and the traveling object; and
executing collision control on the traveling object based on the relative relationship between the target object and the forward collision hazard region and the distance.

* * * * *